US006720678B2

(12) United States Patent  (10) Patent No.: US 6,720,678 B2
Green et al.  (45) Date of Patent: Apr. 13, 2004

(54) ARC WELDING ELECTRICAL SHOCK PROTECTION CIRCUIT

(76) Inventors: Donald F. Green, P.O. Box 513, Rocanville, Saskatchewan (CA), S0A 3L0; Darren K. Green, P.O. Box 192, Rocanville, Saskatchewan (CA), S0A 3L0; Christopher L. Green, P.O. Box 448, Rocanville, Saskatchewan (CA), S0A 3L0

( * ) Notice: Subject to any disclaimer, the term of this patent is extended or adjusted under 35 U.S.C. 154(b) by 205 days.

(21) Appl. No.: 10/076,052

(22) Filed: Feb. 15, 2002

(65) Prior Publication Data

US 2003/0155816 A1 Aug. 21, 2003

(51) Int. Cl.[7] ............................................... H02H 3/00
(52) U.S. Cl. ...................... 307/326; 307/116; 219/132
(58) Field of Search ................................. 307/116, 125, 307/326, 131; 219/130.01, 130.1, 132, 136

(56) References Cited

U.S. PATENT DOCUMENTS 4,514,615 A    4/1985   Simoneau et al. .......... 219/132

Primary Examiner—Gregory J. Toatley, Jr.

(74) Attorney, Agent, or Firm—Adrian D. Battison; Michael R. Williams; Ryan W. Dupuis

(57) ABSTRACT

The invention is an electronic device used to prevent electrical shock to users of arc welding equipment. The device utilizes the electrical power supplied by the welder, it has no internal power supply. The unit is designed with a high amperage SCR, connected between the welder and either the electrode holder or the work-piece. A control circuit is situated in parallel with the SCR and is used to control the SCR. The control circuit constantly monitors the status of the electrode. A high resistance between the electrode and the work-piece causes the unit to revert to an off condition preventing electrical power from reaching the electrode. Upon striking the electrode against the work-piece, the control circuit detects the internal voltage drop that occurs within the control circuit and then outputs an appropriate signal to cause the unit to switch to an on condition. The predetermined resistance value is set to 40 ohms or less. This level of resistance is required to prevent electrical shock to a wet human body when the electrode and work-piece may be contacted simultaneously. A small ground wire is connected between the unit and the ground of the welder to provide an electrical ground for the control circuit. The welder must be a DC welder, either stationary or mobile, and it can be operated in either reverse polarity or straight polarity position.

19 Claims, 3 Drawing Sheets

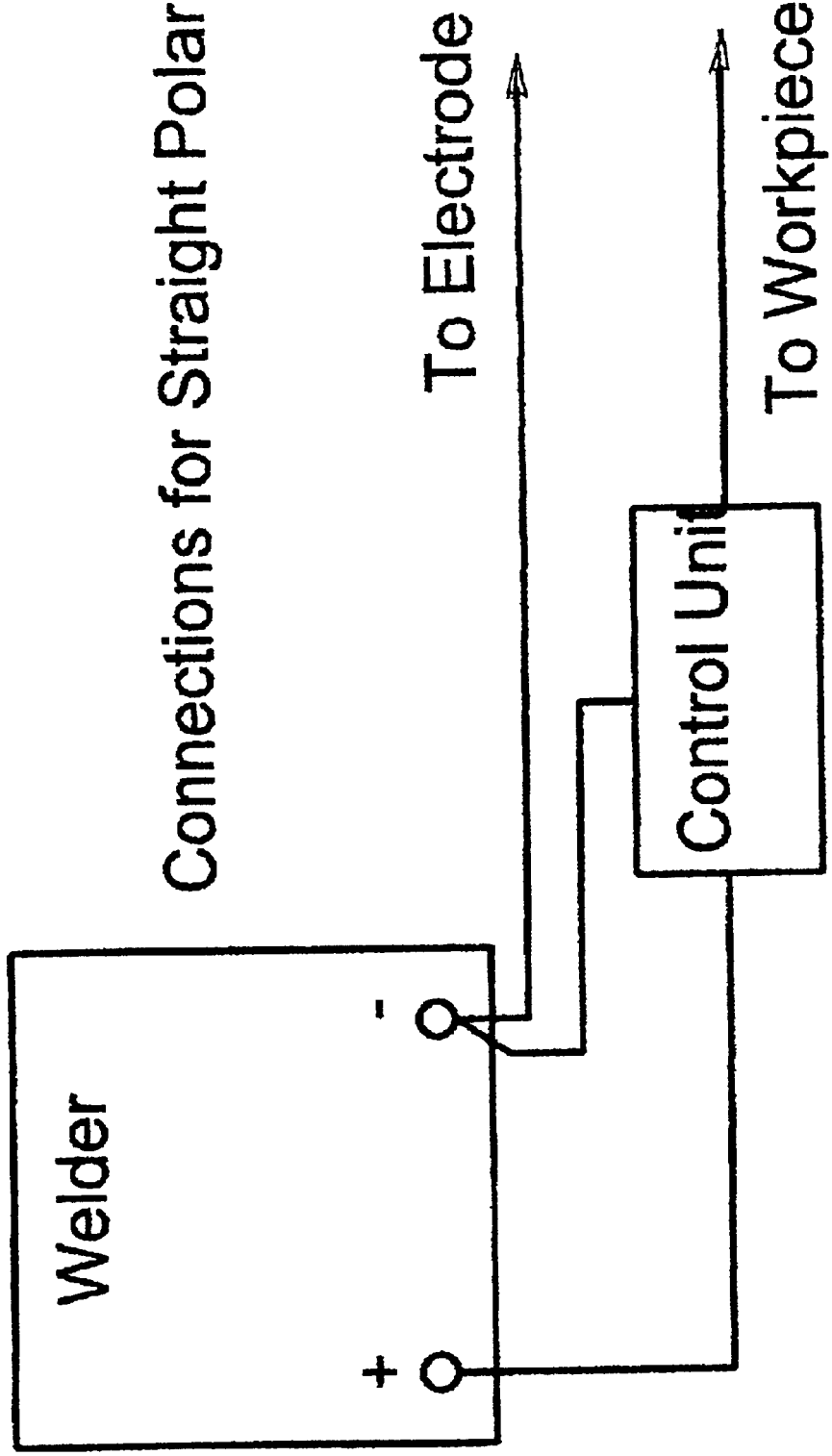

ARC WELDING ELECTRICAL SHOCK PROTECTION CIRCUIT

The present invention relates to an intelligent control circuit used to control the power supplied to an electrode of the type used in the electrical arc welding process. The control circuit protects welders against electric shocks by blocking the voltage potential from electrode or work-piece, depending on the polarity setting of the welder.

BACKGROUND OF THE INVENTION

The vast majority of accidents that involve electrical shock, during the arc welding process, occur when the user changes rods. The conditions for receiving electrical shock are greatly enhanced when dealing with wet or humid environments. The differences in individual body resistance is also a factor. These conditions can be even more hazardous when the environment is a wet mineralized process such as found in potash refining.

When the user changes rods he is subjected to the full welder output voltage potential. If the resistance path through the user is low enough to conduct current, then electrical shock occurs. The shocks can range from mild to severe, even to the point of fatality. The locations that workers must weld in do not lend themselves well to former methods of protection, such as rubber mats, rubber gloves, anti-moisture sprays, etc.

It is well known that a serious hazard exists in the open circuit voltage that users are subjected to when changing electrodes. The degree of risk is intensified by damp or wet environmental conditions. In previous inventions there were various types of manual or automatically operated circuits incorporating mechanical contactors, the main function of which was to disconnect the electrode from the power supply when welding was ceased. However, those mechanical contactors suffer a major drawback, in that they have a low time of response. None of the suggested electro/mechanical circuits were able to offer a reliable and efficient operation to gain acceptance amongst welders. In another previous invention that utilized a solid state design also had design flaws that rendered the design unreliable and unsafe for use in all but the least hazardous environments.

In U.S. Pat. No. 4,514,615 is shown an arrangement of this type which uses an SCR Thyristor switch to control the current to the electrode in dependence upon a control circuit which detects the impedance of the electrode and only allows flow of current in the event that the impedance is less than 400 ohms.

SUMMARY OF THE INVENTION

It is one object of the present invention to provide a control apparatus for the electric welder which is more practical in its operation thus providing an apparatus which is useable in the industry.

According to a first aspect of the invention there is provided a control apparatus for controlling supply of voltage from the supply unit to the electrode of a DC electric welder for protecting a user of the electrode against electric shock when changing rods in the electrode, the apparatus comprising:

an input terminal for connection to a the supply unit for receiving therefrom a DC current for supply to the electrode;

an output terminal for connection to the electrode for supplying the current from the supply unit to the electrode for powering the electrode during use;

a supply line connected between the input terminal and the output terminal;

an electronic current switch in the supply line operable to transmit or to not transmit the current from the input terminal to the output terminal;

a detector circuit arranged to detect the electrical resistance between the output terminal and ground;

and a control circuit arranged to actuate the switch to effect transmission of current only if the resistance detected is less than or equal to 120 ohms.

Preferably the control circuit is arranged to actuate the switch to effect transmission of current only if the resistance detected is less than or equal to 40 ohms Preferably the switch is an SCR thyristor having a gate which is triggered by the control circuit.

Preferably the control circuit is arranged such that the gate of the thyristor is triggered only for a period of time and the gate is then not triggered during normal welding.

Preferably the control circuit is arranged such that the gate is triggered for a period just long enough to complete an arc between the electrode and a workpiece.

Preferably the control circuit is arranged such that the period is of the order of three seconds.

Preferably the control circuit is arranged such that there is a delay before the switch is triggered.

Preferably the control circuit is arranged such that the delay is of the order of 0.5 seconds.

Preferably the control circuit includes a programmable micro-controller chip which allows the chip to be programmed to specific parameters.

Preferably the control circuit includes a programmable micro-controller chip which allows the chip to automatically test all critical components in the control circuit and relate any fault information to the user.

Preferably there are provided reverse polarity protection diodes on all connections from the control circuit to the supply line.

According to a second aspect of the invention there is provided a control apparatus for controlling supply of voltage from the supply unit to the electrode of a DC electric welder for protecting a user of the electrode against electric shock when changing rods in the electrode, the apparatus comprising:

an input terminal for connection to a the supply unit for receiving therefrom a DC current for supply to the electrode;

an output terminal for connection to the electrode for supplying the current from the supply unit to the electrode for powering the electrode during use;

a supply line connected between the input terminal and the output terminal;

an SCR thyristor switch in the supply line operable to transmit or to not transmit the current from the input terminal to the output terminal;

a detector circuit arranged to detect the electrical resistance between the output terminal and ground;

and a control circuit arranged to actuate the SCR thyristor switch to effect transmission of current only if the resistance detected is less than a predetermined value;

wherein the control circuit is arranged such that the gate of the thyristor is triggered only for a period of time and the gate is then not triggered during normal welding.

According to a third aspect of the invention there is provided a control apparatus for controlling supply of voltage from the supply unit to the electrode of a DC electric welder for protecting a user of the electrode against electric shock when changing rods in the electrode, the apparatus comprising:

an input terminal for connection to a the supply unit for receiving therefrom a DC current for supply to the electrode;

an output terminal for connection to the electrode for supplying the current from the supply unit to the electrode for powering the electrode during use;

a supply line connected between the input terminal and the output terminal;

an electronic current switch in the supply line operable to transmit or to not transmit the current from the input terminal to the output terminal;

a detector circuit arranged to detect the electrical resistance between the output terminal and ground;

and a control circuit arranged to actuate the switch to effect transmission of current only if the resistance is less than a predetermined value;

wherein the control circuit includes a programmable micro-controller chip which allows the chip to be programmed to specific parameters.

The distinct feature of the present invention is a control circuit comprised of electronic components, which are reliable, efficient, and extremely fast operation. The control circuit has several design advantages over previous designs that enable the unit to work in even the harshest environments. The unit contains a micro-controller that is used for control of the device and can also test all critical onboard active electronic components. The unit can be used in both reverse polarity configurations as well as straight polarity configurations. The power control circuit prevents electrical power from reaching the electrode until required and the device does not at all interfere with the welding process.

According to the above features, from a broad aspect, there is provided a micro-controller based control circuit for controlling the power supplied to the electrode. The control circuit comprises voltage level detection circuitry used to detect the resistance between the electrode and the work-piece. The control circuit utilizes proprietary embedded firmware to control the unit and to internally test all functions. A power control device is used in series with the electrode in reverse polarity or in series with the work-piece in straight polarity. The power feeding device is controlled by the resistance detection device so as to render the power feeding device conductive when the dynamic voltage drop within the control circuit falls to a predetermined threshold. This threshold is maintained internally within the control circuit and is fixed at 40 ohms or less. Extensive testing has revealed that at resistance values larger than 40 ohms, a wet human body can be subjected to electrical shock by contacting the electrode and the work-piece simultaneously. This is especially true when air arcing is used and the open circuit voltage is very high.

BRIEF DESCRIPTION OF THE DRAWINGS

A preferred embodiment of the present inventions will be described hereinafter with reference to the accompanying drawings, in which:

FIG. 3 is a block diagram illustrating the control circuit and the proper connections for straight polarity use.

DESCRIPTION OF PREFERRED EMBODIMENTS

Before describing the various Figures of the drawings, we will describe the factors associated with the electric shock hazards encountered by welders during electric arc welding operations. Particular emphasis is placed on the factors prevailing when the welding operation is performed in damp environments.

It is well known that the intensity of the current that flows through the human body is the predominant factor that determines the severity of the electric shock. The current that can pass through the body can be greatly influenced by individual resistance as well as the environment where the welding is being done. Environments that are damp or wet from water based liquids are not near as hazardous as those environments where ionized liquids such as brine in potash refining are present. The presence of the ions in the liquid greatly aids conduction of the electrical current thus increasing the severity of the shock received.

The knowledge of the various levels of current flow and their effect on the human body are widely known. It is generally accepted that currents in the 100 mA range are lethal. Current levels in the 16 mA range produces a loss of muscular control. Current levels in the 2 mA and less are deemed to be safe.

Figure 1:
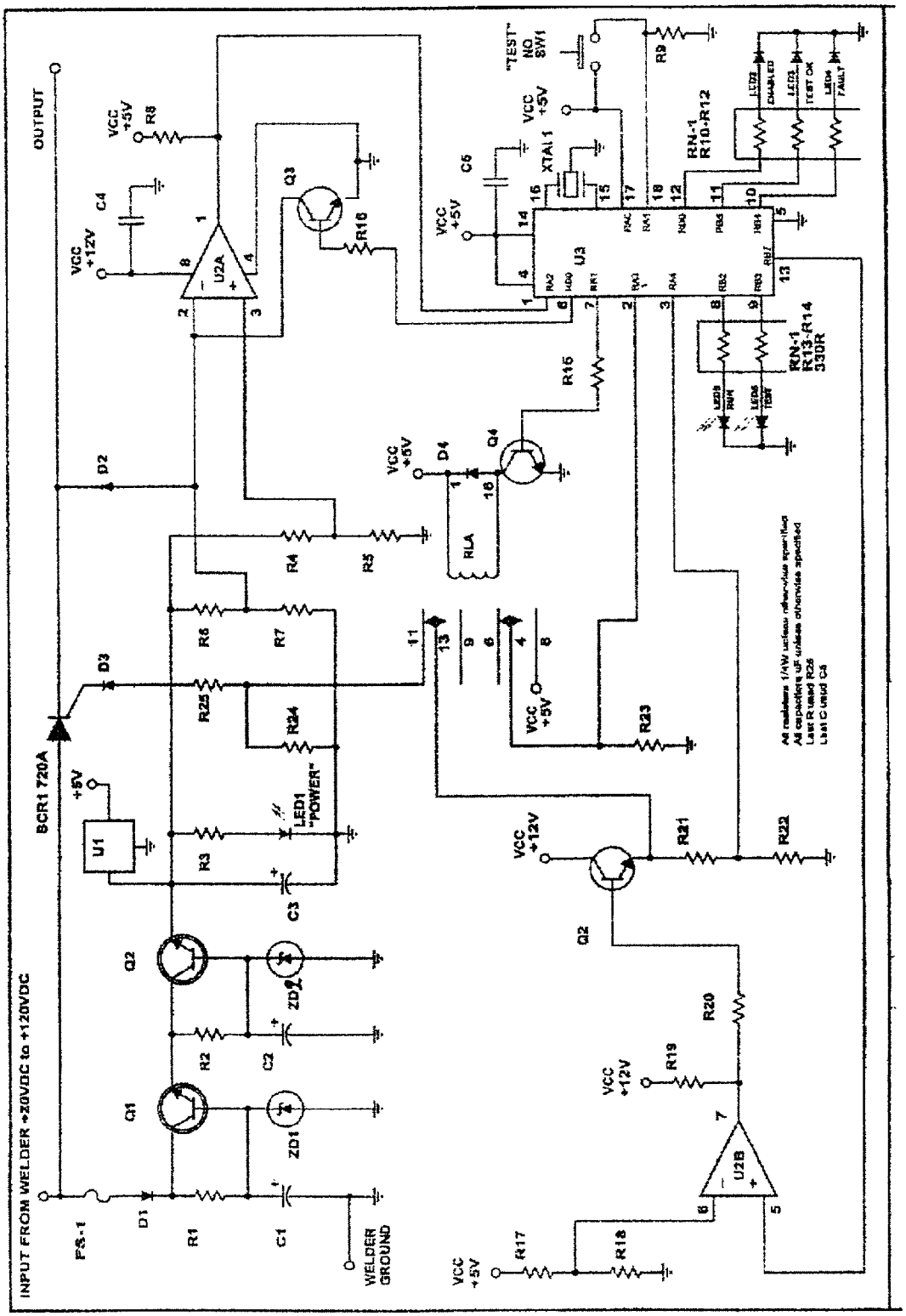
FIG. 1 is a schematic diagram showing the control circuit in accordance with the present invention where a DC welder is used as the power source.
Figure 2:
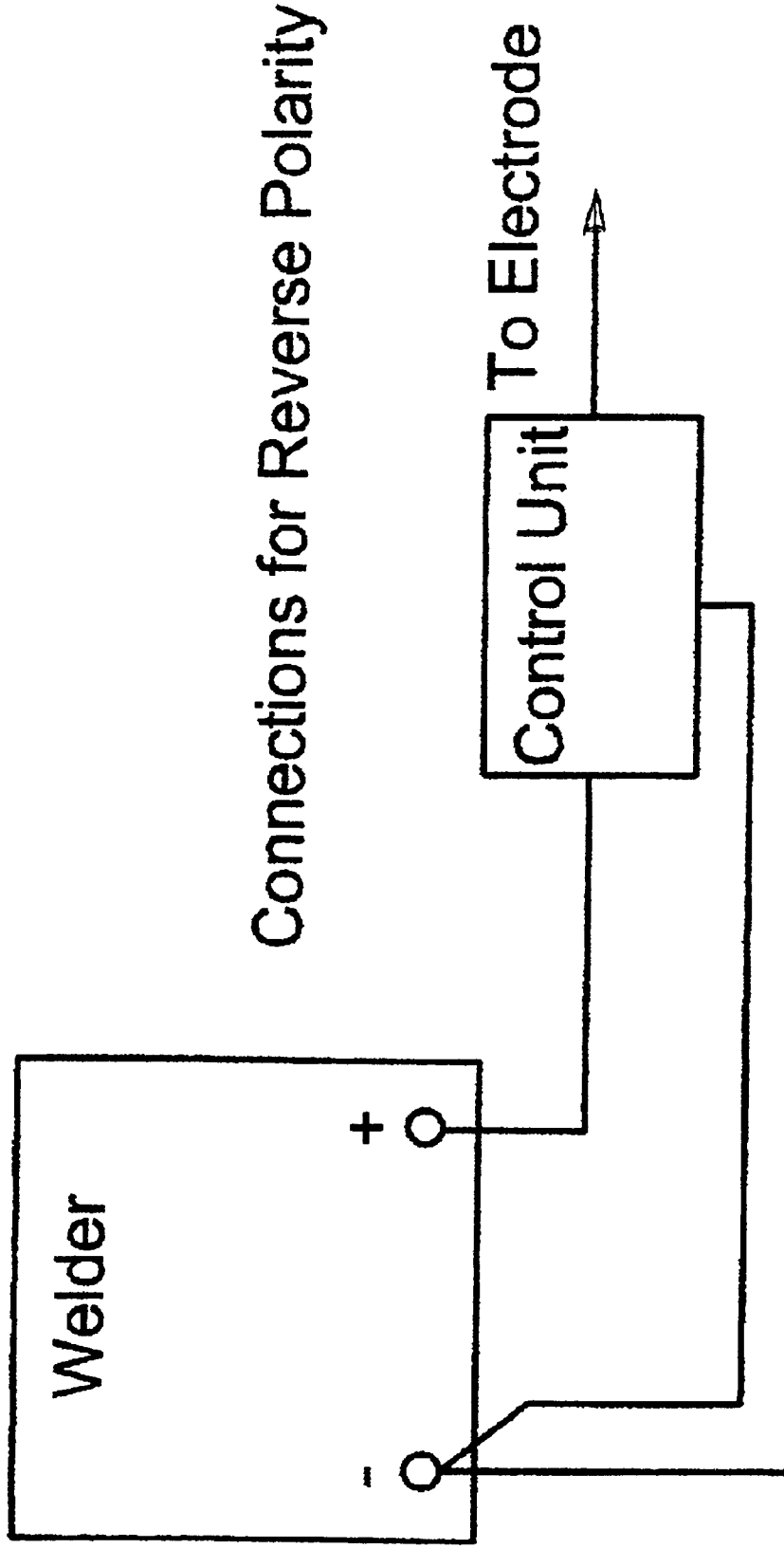
FIG. 2 is a block diagram illustrating the control circuit and the proper connections for reverse polarity use.

Turning now to the control apparatus of the present invention as shown primarily in FIG. 1, the apparatus is fully automatic and comprises an input terminal from the welder supply unit and an output terminal for connection to the electrode, with a supply line therebetween containing a switch SCR1 therein. The unit does not require any operator intervention to facilitate operation. The unit powers up when the user turns the welder on. The unit automatically starts up in "Run" mode. Electrical power from the output of the welder is prevented from reaching the electrode by the switch SCR1.

The control circuit including the comparator U2 and the microprocessor U3 is used to monitor the status of the electrode and activate SCR1 when the user requires power to weld. The unit is intended to function in accordance with the ordinary motion of the welding process. When the user strikes the workpiece with the electrode (as is normal to welding), the control electronics detect the momentary grounding of the electrode. The circuitry accomplishes this by comparing the inputs of comparator U2. When the user strikes the workpiece the momentarily, if the impedance between the rod and the workpiece is sufficiently low, a voltage drop occurs within the control circuit. This voltage drop is detected by comparator U2 and the output of comparator then changes state. The microprocessor constantly scans this input looking for the change of state of the output of U2. The microprocessor U3 is then programmed to create a 0.5 second delay and then triggers the switch SCR1 for a period of 3 seconds. The user thus has 3 seconds in which to establish the arc. If the arc is not established the unit automatically returns to the disabled state and the user must re-trigger the unit. If the user establishes the arc, the normal welding process will continue until the user stops welding and current flow ceases. The unit automatically returns to the disabled state immediately after welding ceases. The times set out above can be varied as required by the user by programing the microprocessor.

The unit is equipped with a "Push To Test" button SW1 which enables the user to test all the internal control electronics. If the user pushes the button the unit will switch to "Test" mode from "Run" mode. After testing the internal electronics the status of the test will be displayed either by the "Test OK" LED or as a series of flashes by the "Fault" LED. After displaying the test results the unit will automatically return to "Run" mode. The front panel LEDs indicate as follows;

"Power"—that the control electronics is powered up

"Run"—that the unit is in run mode

"Enabled"—that the SCR is triggered and power is at the electrode

"Test"—that the unit is in test mode

"Test OK"—that the internal electronics is functional

"Fault"—that a problem exists in the internal electronics (the number of flashes varies according to the nature of the fault)

The following is a list of the flashes emitted by the "Fault" LED (Light Emitting Diode)

1 Flash of the LED indicates that the microcontroller has failed to detect the run mode input or the test mode input as actuated by the test push button.

2 flashes of the LED indicates that relay 1 has failed to switch in test mode 3 flashes of the LED indicates that trigger transistor Q2 has shorted 4 flashes of the LED indicates that the output to the electrode is grounded 5 flashes of the LED indicates that U2 has failed to switch It is important to remember that because of the use of the microcontroller, this functionality is subject to changes and improvements in the firmware that will allow a greater degree of diagnostics by merely changing software. The following describes the Electronics Operation.

Fuse (FS-1, 250 mA) connected at the input terminal is used to protect the control electronics. Normal current draw during operation is 55 mA minimum to a maximum of 160 mA when relay RLA1 is activated. Capacitor C1 between the fuse and ground is used to filter the input voltage from the welder. Diode D1 is used to provide reverse polarity protection in the event that the welder is set to the AC position or the DC straight polarity position without re-connection. Resistor R1 is used to reduce the current through Zener diode ZD1. ZD1 is used to bias the base of pass transistor Q1. Transistor Q1 provides voltage regulation and is used as a pass transistor. Capacitor C2 is used to provide filtering of the output voltage from Q1. Resistor R2 is used to reduce the current through Zener diode ZD2. Zener diode ZD2 is used to bias the base of pass transistor Q2 at 12 volts. Q2 is used as a pass transistor to provide a regulated output of 12 volts to the control electronics. Capacitor C3 is used to filter the output of Q2. R3 is used to limit the current through LED1. LED1 indicates that the circuitry is powered up. Circuit U1 receives the 12V regulated supply and is used to provide a +5V regulated supply voltage to some of the circuitry.

Resistors R4 and R5 provide a fixed voltage to pin 3 of the comparator U2A. Resistors R6 and R7 provide a fixed voltage to pin 2 of comparator U2A. Resistor R6 is used to limit the current that passes through D2 to the electrode. D2 provides reverse polarity protection to the electronics. D2 also ensures that fluctuating voltages at the electrode during welding, cannot feedback into the control circuitry, thereby not affecting the control electronics.

When the user momentarily grounds the electrode, provided the impedance between the output and ground is less than the predetermined value determined by the selection of the Resistors, the voltage at pin 2 of U2A drops rapidly to a value which triggers the output of comparator U2A to rise to +5V. in practice where the impedance is zero, the value is 0.7V. The momentary pulse from comparator U2A is detected by the micro-controller U3. The program embedded in the micro-controller then creates the 0.5 second delay and then turns on output pin 13 to trigger the switch SCR1 for a period of 3 seconds. Whether the user establishes the arc or not, the output pin 13 is automatically turned off and the micro-controller resumes normal operation until the next input pulse is detected.

In the event that the impedance is greater than the predetermined value, that is the electrode is not grounded but is held by the user, the comparator U2A does not output the pulse. The comparator thus can be set by the selection of the Resistors to trigger only at or below a predetermined impedance value which is set at preferably less than 40 ohms. However a value of up to 120 ohms can be used in some less rigorous conditions. However a value of 400 ohms has been found to provide dangerous shocks to the user by actuating the current supply when the electrode is not properly grounded but is instead engaged by the body of the user for example in changing a rod.

When pin 13 is turned on, the output of processor U2B immediately rises to +12V driving the base of the trigger transistor Q2. R20 limits the current to the base of Q2. The output of Q2 then rises and the required gate voltage and current to turn on the switch SCR1 is then applied through R25 and diode D3. Diode D3 provides reverse polarity protection for the control electronics. Diodes D1, D2 and D3 connected between the supply line, from the input terminal to the output terminal, and the control circuit also ensure that fluctuating voltages at the electrode during welding, cannot feedback into the control circuit, thereby not affecting the control functions.

Resistor network RN-1 provides current limiting to the front panel LEDs. Xtal-1 is the oscillation crystal for U3. Push-button "Test" is used to put the micro-controller in test mode instead of run mode. Capacitors C4 and C5 provide noise filtering for U2 and U3. R8 and R19 are used as pull-up resistors and R9, R23, and R24 are used as pull-down resistors.

In test mode Q3 is momentarily turned on by pin 1 of processor U3 to simulate a momentary grounding of the electrode. Relay RLA1, is turned on and input, pin 2, detects that the relay has physically switched. This prevents triggering of the gate of SCR-1 if the relay has not switched. The output of SCR trigger transistor Q2 is disconnected from the gate circuit by switch contacts SC when the relay switches. The micro-controller then simulates a grounding of the electrode and detects if all input circuitry functions properly. The micro-controller then turns on the trigger output and detects via resistors R21 and R22 if all the trigger output circuitry is functioning properly. The results of the test are displayed via the front panel LEDs.

The device as described above has the following features of advantage relative to the prior art set forth above:

We use reverse polarity protection diodes on all connections from the control circuit to the welder line. This means that the input detection circuitry cannot be influenced by fluctuating voltages on the electrode side during the welding process.

We keep the detection current to a maximum of 2 mA when the electrode is grounded and in the microampere range when a higher resistance such as a wet human body is placed between the electrode and the workpiece. This is probably the most important reason why ours is different. In Quebec hydro's patent they state that they set the sensitivity of their units to 500 ohms or less. From our testing in an industrial potash processing plant where there are large quantities of process brine, which is extremely conductive, we found that at 120 ohms or less, people were still taking shocks, especially during the air arcing process. We have preset our sensitivity to 40 ohms or less and people have not taken shocks. We question if theirs worked in practical application.

We use a microcontroller which allows us to program the chip to specific parameters. We have the capability to customize a particular unit to a customer's specifications.

We use a microcontroller that can automatically test all critical components in the control circuit and relate any fault information to the user By using a microcontroller we will have the capability to add functionality to the device through programming. This means that users could upgrade their units to take advantage of the new functions.

We use a series of indication LED's to relate information to the user regarding the status of the unit.

Our unit can be used in both straight polarity as well as reverse polarity and with portable welders as well as stationary welders.

Our unit works with portable welding machines such that the DC power regulation circuitry is designed to operate with a wide voltage input range of 20 volts DC to 120 volts dc. This ensures that when the mobile welder drops into low idle when the user stops welding, that the control circuitry will still function. The value of R1 in the mobile application is less than the value used in the stationary welders where the applied voltage is continuous. The value used for stationary welders is much higher and is used to drop a larger portion of the applied voltage to the control circuit.

Our unit is designed so that it does not work with AC, however all of industry uses DC welders. AC welders are found primarily in farm shops. The reason that our unit is better, is primarily because after the user strikes the arc and the arc is established, our control circuit times out, and the gate drive signal to the SCR is removed. As long as the welding proceeds the gate is not triggered. This is a safety feature. This feature ensures that when welding stops the SCR immediately latches up cutting off power to the electrode, protecting the user. With the Quebec hydro device the gate is constantly triggered during welding, this is why they are able to use their device with AC welders. As a result their gate drive will be delayed shutting off after welding ceases and there is a potential for the user to take a shock.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A control apparatus for controlling supply of voltage from the supply unit to the electrode of a DC electric welder for protecting a user of the electrode against electric shock when changing rods in the electrode, the apparatus comprising:

an input terminal for connection to a the supply unit for receiving therefrom a DC current for supply to the electrode;

an output terminal for connection to the electrode for supplying the current from the supply unit to the electrode for powering the electrode during use;

a supply line connected between the input terminal and the output terminal;

an electronic current switch in the supply line operable to transmit or to not transmit the current from the input terminal to the output terminal;

a detector circuit arranged to detect the electrical resistance between the output terminal and ground;

and a control circuit arranged to actuate the switch to effect transmission of current only if the resistance detected is less than or equal to 120 ohms.

2. The control apparatus according to claim 1 wherein the control circuit is arranged to actuate the switch to effect transmission of current only if the resistance detected is less than or equal to 40 ohms.

3. The control apparatus according to claim 1 wherein switch is an SCR thyristor having a gate which is triggered by the control circuit.

4. The control apparatus according to claim 3 wherein the control circuit is arranged such that the gate of the thyristor is triggered only for a period of time and the gate is then not triggered during normal welding.

5. The control apparatus according to claim 3 wherein the control circuit is arranged such that the gate is triggered for a period just long enough to complete an arc between the electrode and a workpiece.

6. The control apparatus according to claim 3 wherein the control circuit is arranged such that the period is of the order of three seconds.

7. The control apparatus according to claim 1 wherein the control circuit is arranged such that there is a delay before the switch is triggered.

8. The control apparatus according to claim 7 wherein the control circuit is arranged such that the delay is of the order of 0.5 seconds.

9. The control apparatus according to claim 1 wherein the control circuit includes a programmable micro-controller chip which allows the chip to be programmed to specific parameters.

10. The control apparatus according to claim 1 wherein the control circuit includes a programmable micro-controller chip which allows the chip to automatically test all critical components in the control circuit and relate any fault information to the user.

11. The control apparatus according to claim 1 wherein there are provided reverse polarity protection diodes on all connections from the control circuit to the supply line.

12. A control apparatus for controlling supply of voltage from the supply unit to the electrode of a DC electric welder for protecting a user of the electrode against electric shock when changing rods in the electrode, the apparatus comprising:

an input terminal for connection to a the supply unit for receiving therefrom a DC current for supply to the electrode;

an output terminal for connection to the electrode for supplying the current from the supply unit to the electrode for powering the electrode during use;

a supply line connected between the input terminal and the output terminal;

an SCR thyristor switch in the supply line operable to transmit or to not transmit the current from the input terminal to the output terminal;

a detector circuit arranged to detect the electrical resistance between the output terminal and ground;

and a control circuit arranged to actuate the SCR thyristor switch to effect transmission of current only if the resistance detected is less than a predetermined value;

wherein the control circuit is arranged such that the gate of the thyristor is triggered only for a period of time and the gate is then not triggered during normal welding.

13. The control apparatus according to claim 12 wherein the control circuit is arranged such that the gate is triggered for a period just long enough to complete an arc between the electrode and a workpiece.

14. The control apparatus according to claim 12 wherein the control circuit is arranged such that the period is of the order of three seconds.

15. The control apparatus according to claim 12 wherein the control circuit is arranged such that there is a delay before the switch is triggered.

16. The control apparatus according to claim 7 wherein the control circuit is arranged such that the delay is of the order of 0.5 seconds.

17. A control apparatus for controlling supply of voltage from the supply unit to the electrode of a DC electric welder for protecting a user of the electrode against electric shock when changing rods in the electrode, the apparatus comprising:

an input terminal for connection to a the supply unit for receiving therefrom a DC current for supply to the electrode;

an output terminal for connection to the electrode for supplying the current from the supply unit to the electrode for powering the electrode during use;

a supply line connected between the input terminal and the output terminal;

an electronic current switch in the supply line operable to transmit or to not transmit the current from the input terminal to the output terminal;

a detector circuit arranged to detect the electrical resistance between the output terminal and ground;

and a control circuit arranged to actuate the switch to effect transmission of current only if the resistance is less than a predetermined value;

wherein the control circuit includes a programmable micro-controller chip which allows the chip to be programmed to specific parameters.

18. The control apparatus according to claim 17 wherein the chip is arranged to automatically test all critical components in the control circuit and relate any fault information to the user.

19. The control apparatus according to claim 17 wherein there are provided reverse polarity protection diodes on all connections from the control circuit to the supply line.

* * * * *